(12) United States Patent
Nanri et al.

(10) Patent No.: US 12,338,875 B2
(45) Date of Patent: Jun. 24, 2025

(54) SILENT CHAIN AND CHAIN DRIVE SYSTEM

(71) Applicant: TSUBAKIMOTO CHAIN CO., Osaka (JP)

(72) Inventors: Ryosuke Nanri, Osaka (JP); Kosuke Yabuki, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 0 days.

(21) Appl. No.: 18/431,096

(22) Filed: Feb. 2, 2024

(65) Prior Publication Data
US 2024/0309940 A1 Sep. 19, 2024

(30) Foreign Application Priority Data

Mar. 13, 2023 (JP) ................................. 2023-038416

(51) Int. Cl.
*F16G 13/04* (2006.01)
(52) U.S. Cl.
CPC .................................... *F16G 13/04* (2013.01)
(58) Field of Classification Search
CPC .................................. F16G 13/04; F16G 13/06
See application file for complete search history.

(56) References Cited

U.S. PATENT DOCUMENTS

| | | | | |
|---|---|---|---|---|
| 4,832,668 A | * | 5/1989 | Ledvina | F16G 13/04 474/155 |
| 5,397,280 A | * | 3/1995 | Skurka | F01L 1/022 474/206 |
| 5,453,059 A | * | 9/1995 | Avramidis | F01L 1/024 474/212 |
| 5,470,282 A | * | 11/1995 | Ledvina | F16H 7/24 474/230 |
| 5,588,926 A | * | 12/1996 | Mott | F16G 13/04 474/212 |
| 2002/0058561 A1 | * | 5/2002 | Kanehira | F16G 13/04 474/212 |
| 2002/0119853 A1 | | 8/2002 | Horie | |
| 2010/0004083 A1 | * | 1/2010 | Bongard | F16G 13/04 474/212 |

FOREIGN PATENT DOCUMENTS

JP 2002-250406 A 9/2002

* cited by examiner

*Primary Examiner* — Henry Y Liu
*Assistant Examiner* — Mark K Buse
(74) *Attorney, Agent, or Firm* — WHDA, LLP

(57) ABSTRACT

To provide a high-strength silent chain and a chain drive system. The silent chain is made up of a plurality of link plates pivotably coupled together with connecting pins. The plurality of link plates include two or more types of link plates having different shapes. The link plates of different shapes are designed to have pitch lines at the same height when the link plates sit on a sprocket. The chain drive system includes this silent chain.

5 Claims, 3 Drawing Sheets

SILENT CHAIN AND CHAIN DRIVE SYSTEM

BACKGROUND OF THE INVENTION

1. Field of the Invention

The present invention relates to a silent chain and a chain drive system.

2. Description of the Related Art

Some chain drive systems use a plurality of sprockets and a silent chain passed over these sprockets. Such chain drive systems are widely used in various applications for transmitting drive force, synchronizing rotation timing, and facilitating changes in RPM or torque.

A silent chain is typically made up of a large number of link plates, each of which has a pair of teeth and a pair of pin holes. These link plates are pivotably coupled together by connecting pins passed through the pin holes. A chain drive system is designed to transmit rotation by an endless chain passed over a plurality of sprockets, the teeth of the link plates meshing with the teeth on the sprockets.

Japanese Patent Application Publication No. 2002-250406 discloses a randomized silent chain that uses two types of link plates randomly arranged along the longitudinal direction of the chain in an endless configuration. The link plates of a first type start meshing on the inner crotch and sit on the sprocket teeth on outer flanks, and the link plates of a second type start meshing and sit on the sprocket teeth only on the outer flanks. In this silent chain, the ratio of the link plates of the first type included in the chain is less than 50%. At least one or more link plates of the second type are arranged on either the front and/or back of each link plate of the first type in a random manner.

SUMMARY OF THE INVENTION

The randomized silent chain has relatively low strength due to a large tension on the tension side compared to a monotype silent chain that uses a single type of link plates.

The present invention was made in view of the issue described above, with an aim to provide a high-strength silent chain and a chain drive system.

The silent chain according to the present invention is made up of a plurality of link plates pivotably coupled together with connecting pins. The plurality of link plates include two or more types of link plates having different shapes. The link plates of different shapes are designed to have pitch lines at the same height when the link plates sit on a sprocket. The link plates designed to have the pitch lines at the same height help stabilize the engagement of the silent chain. The maximum tension applied to the chain is thereby reduced, resulting in increased strength of the chain.

The link plates of different shapes should preferably have different inner flank angles. In particular, the link plates of different shapes should preferably be designed with a difference in inner flank angle being within 28°. This range ensures a reduction in tension applied to the chain compared to conventional silent chains, resulting in increased strength of the chain.

Preferable embodiments of the present invention include a rocker joint silent chain in which link plates are pivotably coupled together with a pair of rocker pins in each joint, and a cylindrical pin silent chain in which link plates are pivotably coupled together with one cylindrical pin in each joint.

A chain drive system according to the present invention includes a silent chain made up of a plurality of link plates pivotably coupled together with connecting pins, and a plurality of sprockets the silent chain is passed over. The plurality of link plates include two or more types of link plates having different shapes. The link plates of different shapes are designed to have pitch lines at the same height at least when the link plates sit on one of the plurality of sprockets.

The present invention can provide a high-strength silent chain and a chain drive system.

DESCRIPTION OF THE PREFERRED EMBODIMENTS

Embodiment 1

Figure 1:
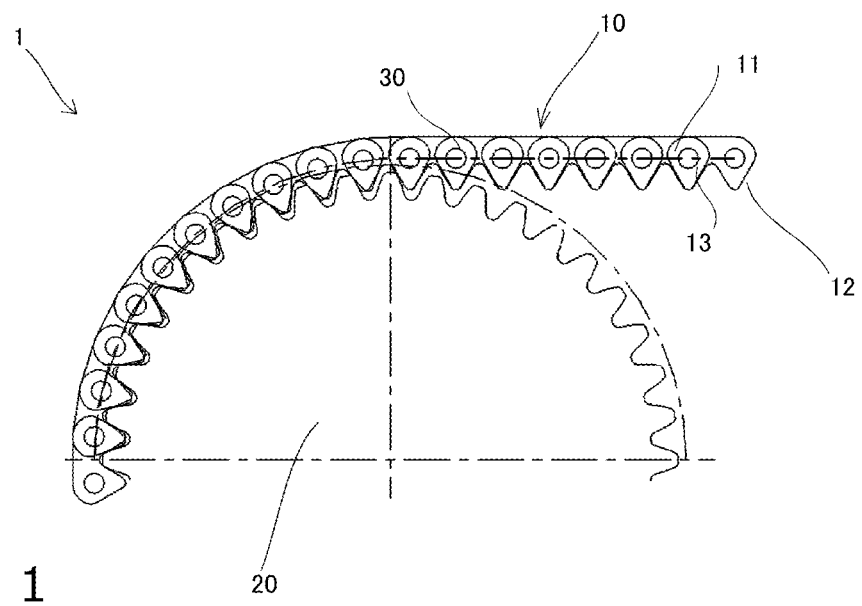
FIG. 1 is a diagram illustrating a silent chain drive device according to a first embodiment of the present invention.

One embodiment of the present invention will be hereinafter described in detail with reference to the accompanying drawings. It should be noted that the embodiment is one example and the present invention is not limited to this embodiment. Same components will be given the same reference numerals, sometimes with an alphabetical letter further added to distinguish one component from another by its position or shape.

Figure 2:
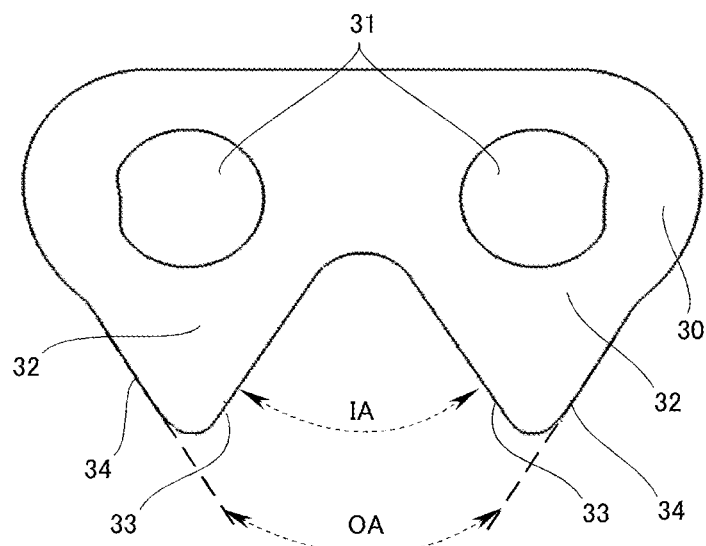
FIG. 2 is a front view of a link plate in the silent chain according to the first embodiment of the present invention.

FIG. 1 illustrates a silent chain drive device 1 according to this embodiment. The silent chain drive device 1 is composed of a silent chain 10 and a plurality of sprockets 20. The silent chain 10 is made up of alternating rows 11 of guide plates and rows 12 of link plates 30, offset from each other by half a pitch along the longitudinal direction of the chain, and pivotably coupled together by pairs of pins 13. As shown in FIG. 2, the link plate 30 has a pair of pin holes 31 for receiving the pair of pins 13, and a pair of teeth 32. The teeth 32 have inner flanks 33 and outer flanks 34. Referring back to FIG. 1, the silent chain 10 in this embodiment is a randomized type and includes two types of link plates 30 with different shapes (to be described later). When the silent chain 10 runs onto the sprocket 20 from a free span in this silent chain drive device 1, the teeth 32 of each link plate 30 come into contact and engage with the teeth on the sprocket 20 (engaging action), and "sit" as the silent chain 10 bends and wraps around the sprocket (sitting action). All the link plates 30 repeat these engaging and sitting actions in cycles at high speed during the rotation.

Figure 3:
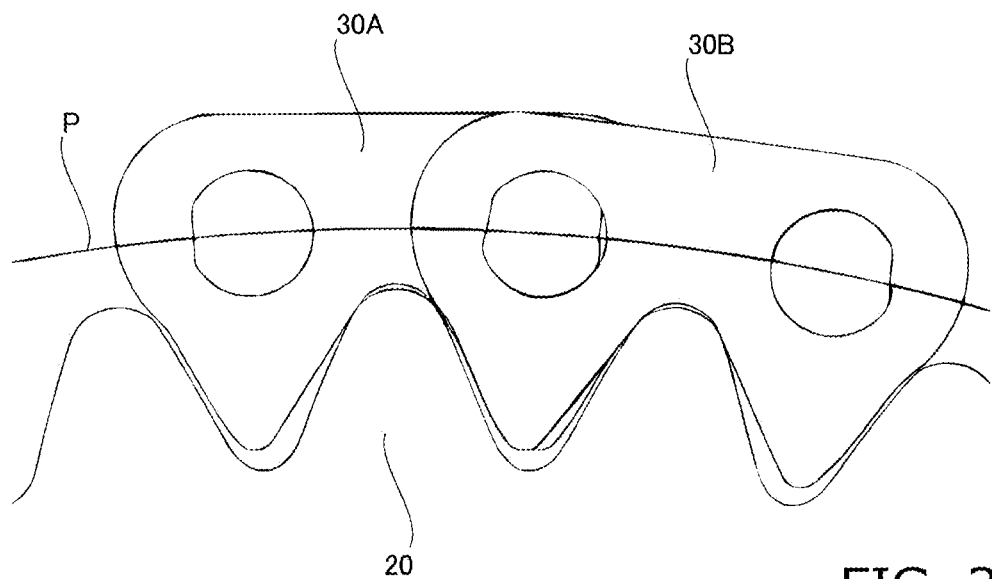
FIG. 3 is a diagram illustrating the silent chain according to the first embodiment of the present invention when engaged.

FIG. 3 shows link plates 30 having different shapes. Specifically, a first link plate 30A and a second link plate 30B have different inner flank angles. This embodiment shows one example in which the entire silent chain 10 contains 30% first link plates 30A. The first link plates 30A have a larger inner flank angle than the second link plates 30B. The "inner flank angle" in this embodiment refers to the internal angle IA between straight parts of the inner flanks 33 of the link plate 30. An "outer flank angle" refers to the internal angle OA between straight parts of the outer flanks 34 of the link plate 30. The difference in inner flank angle between the first link plate 30A and the second link plate 30B causes them to engage with the sprocket teeth at different positions when they sit on the sprocket.

The first link plate 30A and the second link plate 30B are designed such that their pitch lines P are at the same height when they sit on the sprocket. As shown in FIG. 3, the pitch lines P of the link plates 30 are coincident. The inner flank angle of the first link plate 30A is larger than that of the second link plate 30B by 2°. If the pin holes 31 in the first link plate 30A were positioned the same as the pin holes 31 of the second link plate 30B, the pitch line P of the first link plate 30A would be positioned lower than that of the second link plate 30B. Therefore, the pin holes 31 are formed at a higher position in the first link plate 30A than those of the second link plate 30B to match the heights of the pitch lines P. This makes the pitch lines P of the first link plate 30A and second link plate 30B to be at the same height when the link plates sit on the sprocket. The "height of the pitch line P" here refers to the distance (radial distance) from the rotation center of the sprocket to the pitch line P when the link plate 30 sits on the sprocket.

In this embodiment, when the silent chain 10 engages with the sprocket 20, the pitch lines P of all the link plates 30 making up the silent chain 10 are at the same height. Therefore, the rise and fall of the chain, as the silent chain 10 wraps around the sprocket 20, are minimized, and thus the engagement of the silent chain 10 is stabilized.

Figure 4:
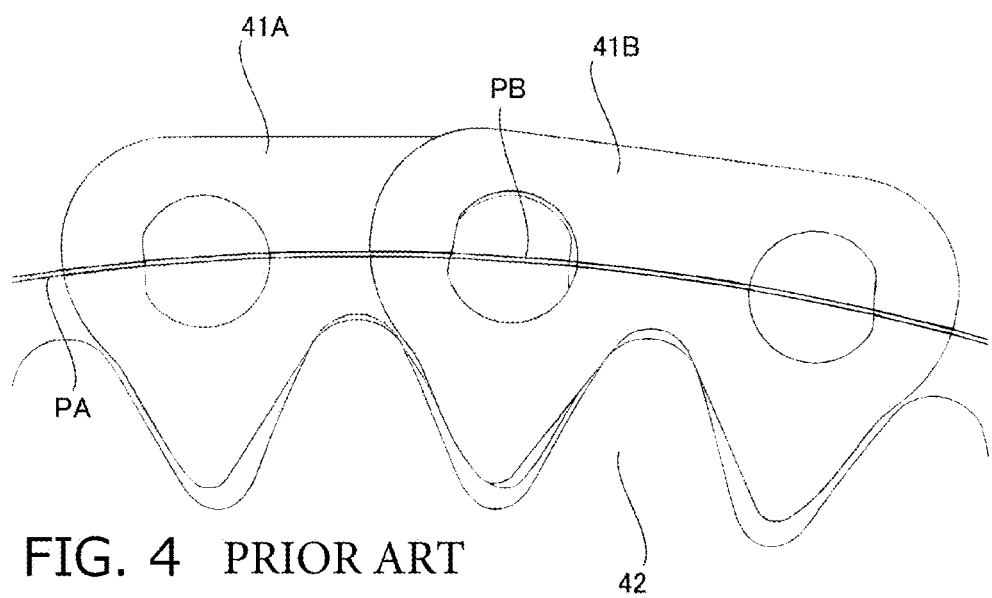
FIG. 4 is a diagram illustrating a conventional silent chain when engaged.

In a conventional silent chain that contains two or more types of link plates 41 (first link plates 41A and second link plates 41B) such as those shown in FIG. 4, the pitch line PA of the first link plate 41A was not at the same height as the pitch line PB of the second link plate 41B when the link plates sit on the sprocket 42. Therefore, as the silent chain wraps around the sprocket 42, the link plates 41 would move up and down at the joints between the first link plates 41A and the second link plates 41B. This motion increases the tension applied to the tension side of the silent chain, and is the reason for the lower strength compared to a monotype silent chain that consists only of a single type of link plates 41.

Compared to conventional silent chains which is not considered the pitch line, the uniform pitch line of the silent chain 10 in this embodiment helps stabilize the engagement of the chain and reduces the tension applied to the chain. The silent chain 10 according to this embodiment thus exhibits higher strength. With reduced tension and minimized rise and fall of the chain (chordal action), noise and vibration can also be suppressed. Moreover, the silent chain 10 in this embodiment, with higher strength, can be reduced in width, allowing a decrease in size and weight. Furthermore, with reduced tension applied to the silent chain 10, the contact force between the silent chain 10 and the sprocket 20 is diminished, which helps minimize wear on both the silent chain 10 and the sprocket 20.

Figure 5:
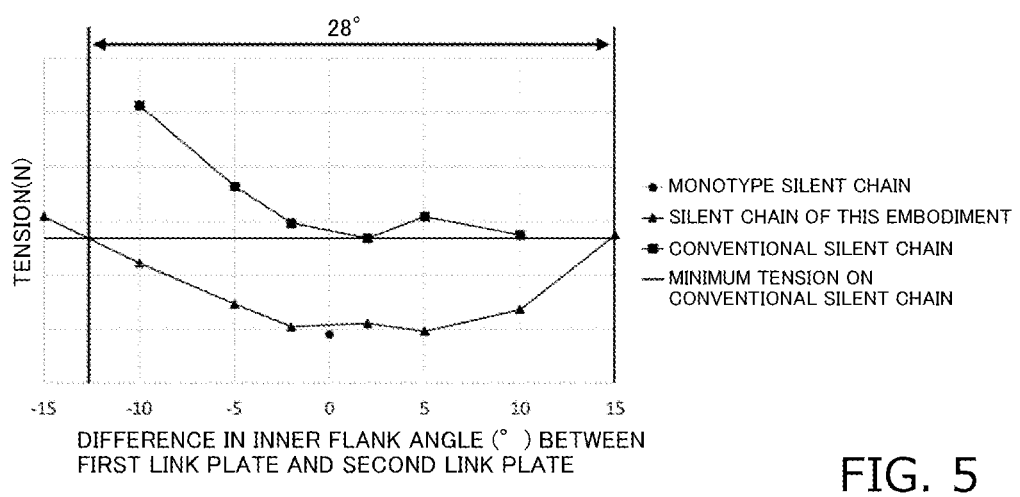
FIG. 5 is a graph showing the tension in relation to the difference in inner flank angle between a first link plate and a second link plate.

In this embodiment, the difference in inner flank angle between different types of link plates 30 is set to be within 28°. FIG. 5 is a graph showing the changes in tension on silent chains measured in relation to various inner flank angles between the first link plate 30A and the second link plate 30B. As a comparison, FIG. 5 also shows the changes in tension on conventional silent chains measured in relation to various inner flank angles between the first link plate 41A and the second link plate 41B, along with the tension on a monotype silent chain.

As shown in FIG. 5, the tension on the link plates 30 having the same pitch line P according to this embodiment was consistently smaller than the tension on the conventional silent chain. The tension was consistently smaller than the minimum tension on the conventional silent chain, particularly when the difference in inner flank angle was in the range between −13° and 15°, i.e., when the difference in inner flank angle between the two types of link plates 30 was within the range of 28° (indicated with arrows in FIG. 5). Therefore, by setting the difference in inner flank angle to be within this range, the tension can be lowered, and noise and vibration can be reduced. The difference in inner flank angle of the link plates 30 may preferably be within 7°. Within this range, the tension on the randomized silent chain can be reduced to substantially the same level of tension on a monotype silent chain, which ensures reduction of noise and vibration.

Figure 6:
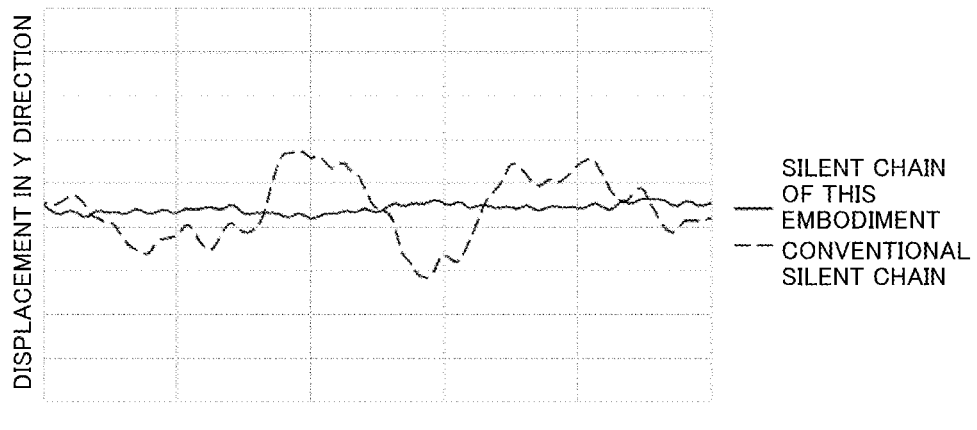
FIG. 6 is a graph showing the displacement in the Y direction of the silent chain according to the embodiment and a conventional silent chain.

The silent chain of this embodiment is described in more detail with an example. FIG. 6 is a graph showing the running line of a given link plate on the tension side of the silent chain 10 in this embodiment. The horizontal axis represents displacement in the X direction, and the vertical axis represents displacement in the Y direction. The X direction here corresponds to the running direction of the chain, while the displacement in the Y direction refers to vertical displacements relative to the running direction of the chain, such as the lift of the chain. As a comparison, FIG. 6 also shows the running line of a given link plate on the tension side of a conventional silent chain that has varying pitch line heights when the link plates sit on the sprocket.

As shown in FIG. 6, the link plate of the conventional silent chain with varying pitch line heights when the link plates sit on the sprocket (dotted line in FIG. 6) underwent large displacements in the Y direction relative to the displacements in the X direction. On the other hand, in the case with the silent chain 10 according to this embodiment (solid line in FIG. 6), the displacements in the Y direction relative to the displacements in the X direction were suppressed. This indicates that the uniform pitch line effectively stabilized the engagement of the silent chain 10 and reduced the tension applied to the chain.

Variation Example

The present invention is not limited to the embodiment described above. For example, the silent chain 10 is not limited to the embodiment described above in which two types of link plates 30 are used. The silent chain may include two or more types of link plates 30 of different shapes having the same pitch line height when seated on the sprocket. In this embodiment, one example was shown in which 30% of all the link plates were the first link plates 30A. The ratio of two or more types of link plates 30 in the chain is not particularly limited. The first link plate 30A and second link plate 30B may have different outer flank angles instead of different inner flank angles. The link plate 30 may start meshing with the teeth on the sprocket 20 on either of the inner flank 33 and the outer flank 34. In this embodiment, the difference in inner flank angle between different types of link plates 30 is set to be within 28°. This is merely a preferable range. The silent chain may be configured differently, such that the link plates 30 have pitch lines at a consistent height at least when the link plates sit on the sprocket.

The silent chain according to the embodiment may be used as a rocker joint silent chain in which link plates are pivotably coupled together with a pair of rocker pins in each joint, or a cylindrical pin silent chain in which link plates are pivotably coupled together with one cylindrical pin in each joint.

The effect of reducing the tension, and of increasing the strength of the chain, can be achieved in a chain drive device 1 that uses the silent chain 10 of this embodiment as long as the link plates 30 have their pitch lines P at the same height when seated on at least one of multiple sprockets 20. The tension can be reduced even more and the chain strength increased more, by designing the link plates 30 such as to have the pitch lines P at the same height when seated on all of the sprockets 20.

What is claimed is:

1. A silent chain comprising a plurality of link plates pivotably coupled together by connecting pins,
    the plurality of link plates including two or more types of link plates having different shapes,
    the link plates of different shapes being designed to have a distance (radial distance) from the rotation center of a sprocket to the pitch line is same when the link plates sit on the sprocket having a common shape.

2. The silent chain according to claim 1, wherein the link plates of different shapes have different inner flank angles.

3. The silent chain according to claim 2, wherein the link plates of different shapes are designed with a difference in inner flank angle within 28°.

4. The silent chain according to claim 1, wherein the silent chain is a rocker joint silent chain in which link plates are pivotably coupled together with a pair of rocker pins in each joint, or a cylindrical pin silent chain in which link plates are pivotably coupled together with one cylindrical pin in each joint.

5. A chain drive system comprising:
    a silent chain made up of a plurality of link plates pivotably coupled together with connecting pins; and
    a plurality of sprockets the silent chain is passed over,
    the plurality of link plates including two or more types of link plates having different shapes,
    the link plates of different shapes being designed to have a distance (radial distance) from the rotation center of a sprocket to the pitch line is same at least when the link plates sit on one of the plurality of sprockets, wherein the one of the sprockets has a common shape.

* * * * *